Dec. 3, 1940.  C. A. NORGREN  2,223,700
LUBRICATOR
Filed Oct. 10, 1938
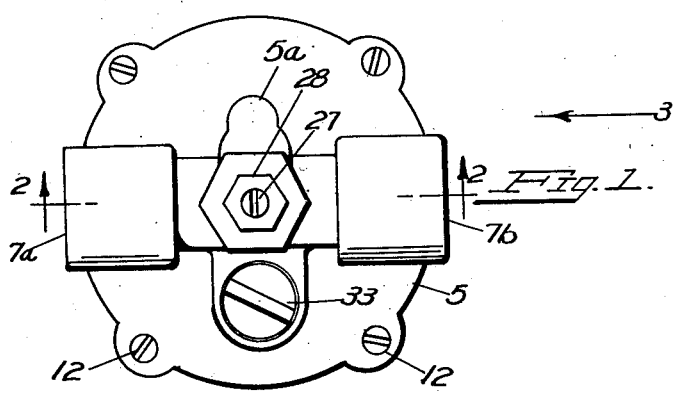
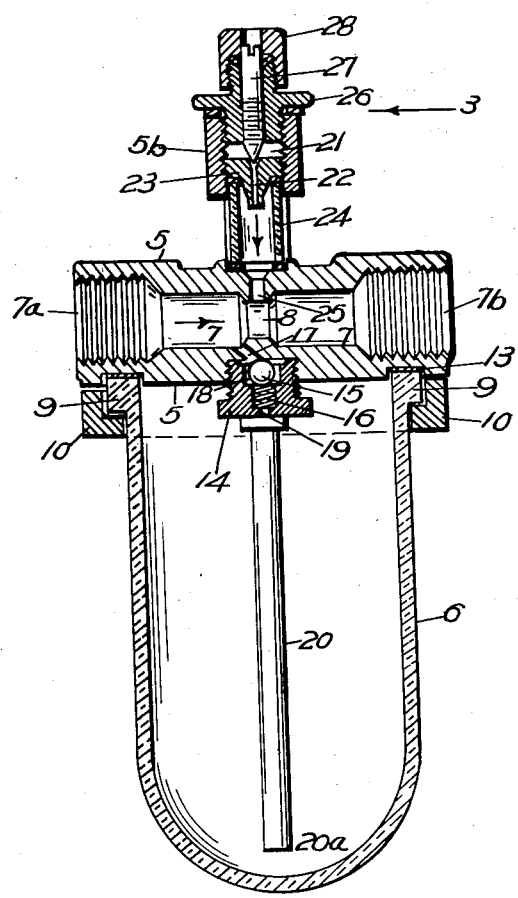
Fig. 2.
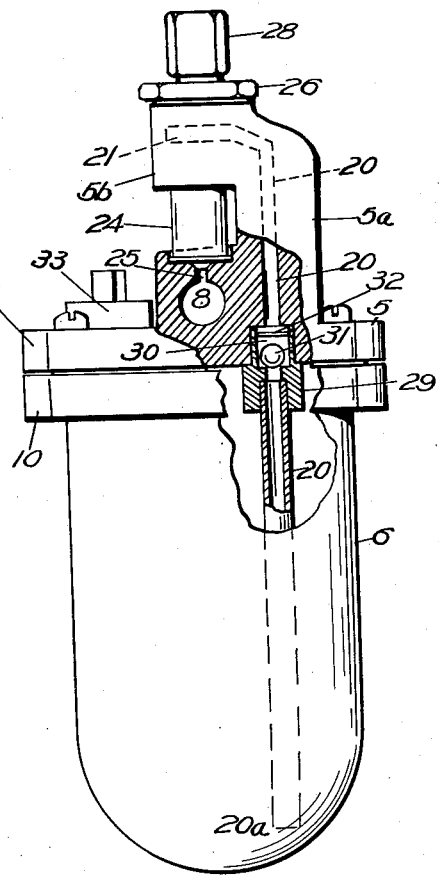
Fig. 3.
INVENTOR.
CARL A. NORGREN
BY Rollandet, McGrew & Campbell
ATTORNEYS.

Patented Dec. 3, 1940

2,223,700

UNITED STATES PATENT OFFICE 2,223,700

LUBRICATOR

Carl A. Norgren, Denver, Colo.

Application October 10, 1938, Serial No. 234,275

4 Claims. (Cl. 184—55)

This invention relates to improvements in lubricators for pneumatically operated devices, particularly lubricators of the type disclosed in my United States Patent No. 1,782,741, issued November 25, 1930.

When it becomes necessary to replenish the oil supply in the bowl of the lubricator made according to the above patent, it is necessary to shut off the air flow therethrough and temporarily suspend operation of the devices being lubricated thereby, because when the filling plug of such a lubricator is removed, the flow of air from the air line would so fill the bowl that it would be impossible to pour oil into the lubricator.

A principal object of the present invention is to provide means whereby a lubricator of this type can be refilled with oil without interrupting the flow of compressed air therethrough.

Another object is to provide in a lubricator for pneumatic tools, a syphon for the delivery of oil to a flow of air, which will hold oil and prevent its return to the oil reservoir of the lubricator, during refilling of said reservoir.

Still another object is the provision of a needle valve to regulate the flow of oil in such a lubricator, which is countersunk to discourage unauthorized tampering.

Still another object of this invention is to provide a lubricator for pneumatic tools, that has a transparent oil bowl.

Other objects and advantages reside in details of design and construction which will be more fully disclosed in the following description and in the drawings wherein like parts have been similarly designated and in which:

Figure 1 is a plan view of a lubricator built according to this invention;

Figure 2 is a vertical section taken along the line 2—2 of Figure 1; and

Figure 3 is a side elevation partly in section taken in the direction of arrows 3 of Figures 1 and 2.

The component parts of a typical lubricator that embody the present invention include a valve body 5, an oil bowl preferably made of transparent material 6 and a passageway for a flow of compressed air or the like 7 which has threaded openings to receive air-line connections as at 7a and 7b. The passageway 7 has a restricted portion 8 and the flow of compressed air which is in the direction of the arrow, produces a venturi effect according to the well-known principle as it passes through said restricted portion.

At the upper edge of the bowl 6 is an integral flange 9 adjacent which is a connecting ring 10, and a sealed union between the valve body 5 and the bowl 6 is effected by drawing the body and the ring 10 securely toward the flange 9 by suitable means such as screws 12. A sealing gasket 13 may be used to facilitate the sealed union of the body and the bowl.

A plug 14 is screwed into the underside of the lubricator body 5, and houses a ball check valve 15 that is upwardly urged by a spring 16. A port 17 connects the supply side of the passageway 7 ahead of the restricted portion 8 thereof, with the hollow interior 18 of the plug 14, and another port 19 that opens into the interior of the bowl 6, completes a port connection between the compressed air passageway 7 and the interior of the bowl that is subject to control by the position of the ball check valve 15. Check valve 15 is normally held open by the spring 16 and when it is in its closed position it does not effect an absolute air-tight seal but is so constructed to pass or "leak" a small amount of air into the bowl 6 as will be hereinbelow explained.

A syphon 20 has an open lower extremity 20a in the bowl 6 and is normally immersed in oil in the bowl. The syphon 20 extends upwardly through part 5a of the lubricator body 5 to connect with a chamber 21 in the head 5b of the body. The chamber 21 is in communication with a small port or passage 22 in a threaded plug 23, that is in communication with the interior of a sight feed glass 24 that in turn connects with a suction port 25 which is connected with the restricted portion 8 of the main compressed air passageway 7 to receive and be acted upon by the venturi effect.

To complete the closure of the chamber 21, a threaded plug 26 is screwed into the lubricator head 5b to effect a seal thereof. Within the plug 26 is a countersunk needle valve 27 which is sealed by a packing nut 28. The head of the needle valve 27 is countersunk below the surface of the packing nut 28 to discourage unauthorized tampering with the adjustment of said valve, since a special small tool or screw-driver is required to reach into the needle valve to change its adjustment. The point of the needle valve cooperates with the small passage or port 22 to govern the degree of opening thereof.

As best illustrated in Figure 3, the syphon 20 connects through a plug 29 that is permanently attached in the lubricator body 5 and that provides a valve chamber 30 in which is a ball check valve 31 that is retained within its operating limits by a pin 32.

Operation

In use a filler plug 33 may be removed to permit a supply of lubricating oil to be poured into the bowl 6 whereupon the plug is replaced to seal the lubricator against leakage at this point. As the flow of compressed air passes through the passageway 7 in the direction of the arrow, a venturi or suction effect will draw oil from the bowl 6 through the syphon 20, the chamber 21 and the passage 22 to drip through the sight glass 24 and the suction port 25 into the passageway 7 where it will be atomized by the flow of air or gas and carried to the pneumatic tool or other device that is to be lubricated. The port 17—19 provides a normally open connection between the source side of passageway 7 and the interior of the bowl 6 so that the syphon 20 may function as above set forth, due to an unbalanced pressure in the bowl 6 above the oil and in the restricted portion 8 of the passageway 7. The transparent feature of the bowl 6 provides the advantageous factor that an operator may judge at a glance when it is time to replenish the oil supply in the bowl.

When the oil supply in the bowl 6 is to be replenished, the plug 33 is again removed without cutting off the air flow through the passageway 7. The air pressure in said passageway 7 being above atmospheric pressure will force the check valve 15 down against the pressure of the spring 16 to its closed position, thus preventing any rush of air through the lubricator and out through the filler opening from which plug 33 has been removed. The check valve 31 will also be in its closed position and will prevent air from the passageway 7 backing up through the syphon 20 into the bowl 6. Thus, both connections between the passageway 7 and the interior of the bowl 6 are effectively closed and under these conditions oil may be readily poured into the bowl 6, while maintaining the normal air supply to the pneumatic tools, which is of major importance.

After the refilling operation has been completed and the plug 33 replaced, the check valve 15 which as above set forth does not effect an absolute seal in its closed position, will permit sufficient air to pass or "leak" from the passageway 7 into the interior of the bowl 6 to permit the spring 16 to raise the valve 15 to its normal open position. Check valve 31 is also arranged so that it will not effect an absolute seal in its closed position and therefore within a very short period of time after the plug 33 has been replaced within the body of the lubricator, the above described pressure differential will be reestablished and oil will be drawn from the bowl 6 through the syphon 20 and discharged into the passageway 7 subject to the setting of the needle valve 27 as above explained.

A further advantage in the present construction is the fact that due to the presence of the check valve 31 in the syphon 20, oil that is in the syphon 20 when the plug 33 is removed for refilling the lubricator, will remain up in the syphon so that when the differential pressures are again established, oil will immediately begin to flow into the passageway 7. If all of the oil in the syphon drains back into the bowl 6 when the plug 33 is removed, it would require considerably more time to start the flow of oil into the air-line.

Thus the objects of the invention are accomplished in that the present lubricator can be filled while the pneumatic devices lubricated thereby continue to operate, oil remains in the syphon 20 ready for immediate resumption of feed into the air flow after refilling of the bowl 6, the setting of the needle valve 27 is not easily tampered with, and an operator can see at a glance when the oil supply in the bowl is low. The improved means including the bowl flange 9 and the ring 10 for effecting a sealed union of the transparent bowl 6 with the lubricator body 5, by use of screws 12, adds much to the efficiency of the new lubricator.

While this specification discloses preferred means for reducing the present invention to practice and a preferred embodiment of the invention, changes may occur to those skilled in the art and may be made within the scope of the appended claims, without departing from the spirit of the invention.

What I claim and desire to secure by Letters Patent is:

1. In a lubricator of the character described having a restricted passageway for a flow of compressed air, a bowl for oil, there being an air port connecting the passageway ahead of the restricted portion with the interior of the bowl, and a checkvalve in the port, adapted to close the same when the interior of the bowl is open to atmospheric pressure.

2. In a lubricator of the character described having a restricted passageway for a flow of compressed air, a bowl for oil, there being a port connecting the passageway ahead of the restricted portion with the interior of the bowl, and a normally open checkvalve in the port, the valve being adapted to leak air in its closed position.

3. A lubricator of the character described comprising a body having a passageway for a flow of compressed air, a bowl connected with the body, there being an air port connecting the passageway with the interior of the bowl, a checkvalve in said port, and a checkvalve-controlled syphon connecting the interior of the bowl with the passageway.

4. A lubricator of the character described comprising a body having a Venturi passageway for a flow of compressed air, a bowl connected with the body, there being an air port connecting the passageway ahead of the venturi with the interior of the bowl, a checkvalve in said port, adapted to close the same when the interior of the bowl is open to atmospheric pressure, and a checkvalve-controlled syphon connecting the interior of the bowl with the Venturi passageway, whereby oil is drawn from the bowl through the syphon into said passageway.

CARL A. NORGREN.